Oct. 1, 1935.  F. W. GAY  2,016,004
ELECTRIC CABLE INSTALLATION
Filed Aug. 2, 1929
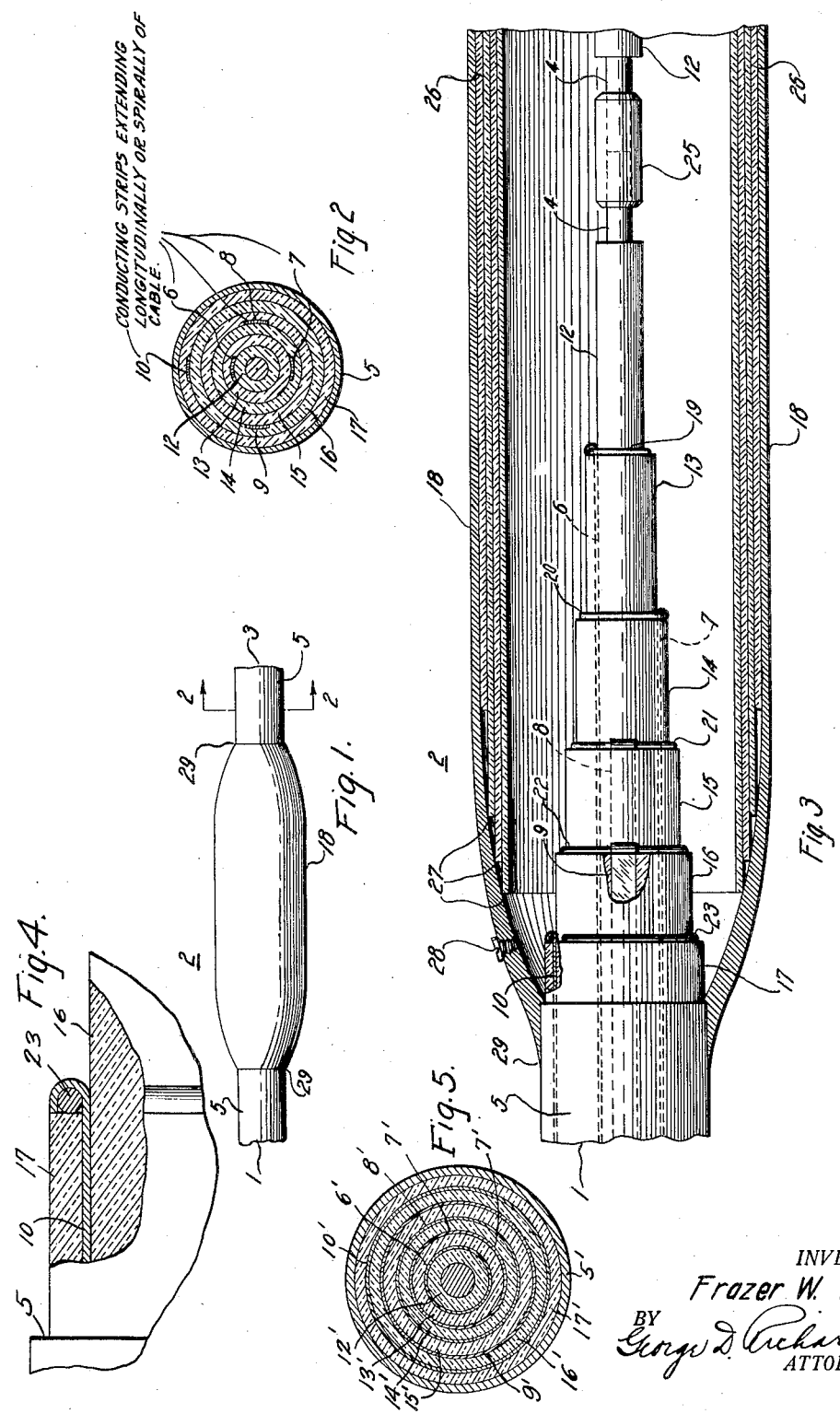
INVENTOR.
Frazer W. Gay
BY George D. Richards
ATTORNEY.

Patented Oct. 1, 1935

2,016,004

UNITED STATES PATENT OFFICE 2,016,004

ELECTRIC CABLE INSTALLATION

Frazer W. Gay, Newark, N. J., assignor to General Cable Corporation, New York, N. Y., a corporation of New Jersey Application August 2, 1929, Serial No. 382,898

11 Claims. (Cl. 173—268)

This invention relates, generally, to underground electrical high voltage cables, and the invention has reference, more particularly, to a novel joint for joining adjacent sections of such cables.

The principal object of the present invention is to provide a novel cable joint so constructed and arranged as to equalize the electric stresses on all longitudinally extending insulating surfaces within the joint, thereby enabling the joint to be constructed so as to have a relatively small diameter and over all length and which may be manufactured cheaply as well as adapted to be readily and easily installed.

It is well known that all points in any thin cylindrical layer of insulation surrounding a single high voltage cable conductor are at substantially the same potential, thereby forming an equipotential surface extending at a constant radial distance from the center of the conductor. If a conductor such as a metal strip or cylinder of metal foil is positioned so as to extend along such an equipotential surface, then the strip or cylinder will tend to remain at the potential of the equipotential surface and a substantial effort must be exerted to change the thusly fixed potential of the strip or cylinder.

In carrying out the present invention, a plurality of metal strips are positioned at varying radial distances from the cable conductor and extend longitudinally within the cable to the cable joint. Within the joint the cable insulation is tapered in a plurality of steps from the cable sheath to the conductor, the longitudinal surface of each of said steps being flush with one of said metal strips. A plurality of conducting rings of successively smaller diameters surround the cable insulation at each step within the joint and are electrically connected to the successive strips, thereby creating circumferential lines of definite potential within the joint. These conducting rings cause the voltage within the joint to be graded in definite steps extending from the sheath to the conductor, and, by placing the rings sufficiently close together and with the longitudinal distance between rings proportional to the voltage between the conducting strips, then equal increments of distance longitudinally within the joint from the sheath to the conductor will represent substantially equal increments of potential. By causing such increments of potential to equal the safe dielectric voltage strength of corresponding increments of longitudinal thickness of the insulating oil used in the joint, then a joint of minimum dimensions and cost is obtained while securing maximum efficiency by reducing the amount of insulation and cable joint sheathing to a minimum. By using conducting rings of round cross section, for example, as disclosed in the embodiment illustrated in the accompanying drawing, the conducting layers embedded in the cable insulation are terminated on the stepped surface of the insulation with conducting surfaces flaring outwardly from the step surfaces.

The invention is clearly illustrated in the accompanying drawing, in which:—

Figure 1 is a side view of the novel joint of the invention used to join two cable sections;

Figure 2 is an enlarged sectional view taken along line 2—2 of Figure 1;

Figure 3 is an enlarged longitudinal sectional view of a portion of the joint;

Figure 4 is an enlarged longitudinal sectional view of a portion of the joint showing more clearly the ring 23 and the terminal of the strip 10; and Figure 5 is a sectional view similar to Figure 2 showing a modified construction.

Similar characters of reference are employed in all of the hereinabove described views, to indicate corresponding parts.

Referring now to the said drawing, the reference numeral 1 designates one cable section which is joined by the novel cable joint 2 of this invention to another adjacent cable section 3. Cable sections 1 and 3 are of the same construction and each has a single, central, longitudinally extending conductor 4 preferably of copper which is surrounded by suitable wrapped insulation such as impregnated fibrous material. This insulation in turn is surrounded and protected by a lead sheath 5. According to the preferred arrangement, a plurality of electrically conducting metal foil strips 6 to 10 are wrapped into the cable insulation at the time of fabricating the cable sections 1 and 3. Strips 6 to 10 are positioned respectively at progressively greater radial distances from the conductor 4, thereby defining concentric layers of insulation 12 to 17 inclusive. Layers of insulation 12 to 17, are illustrated as being of equal thicknesses but it is to be understood that the thicknesses of these several layers may vary with respect to one another.

The lines of demarcation of these several layers of insulation 12 to 17 are generally marked by a cylindrical strip of an insulation different from the main body of insulation. Thus, if impregnated paper is used as the main body of insulation, then cylindrical strips of varnished cambric may be used to define the boundaries of the insulating layers 12 to 17. This construction enables the ready cutting back of the cable insulation into a plurality of strips extending from the conductor to the cable sheath as shown in Figure 3 as will be further explained.

Metal foil strips 6 to 10 are preferably spaced circumferentially as far as possible from one another as shown in Figure 2 and are illustrated in the drawing as extending longitudinally within

tion, of a cable joint connecting said cable sections, said joint comprising an enclosing casing having its ends surrounding and connected to the sheaths of said cable sections, said cable sections having end portions projecting into said enclosing casing, said end portions having their sheaths stripped off and their insulation cut away in steps from the cable sheath to their cable conductors, means connecting said conductors in end-to-end relation, said electric conducting members terminating within said joint at the stepped surfaces of said insulation, and electric conducting rings mounted on the stepped surfaces of said insulation and connected to said conducting members.

4. The combination with adjacent electrical cable sections each having a central main conductor, insulation surrounding said conductors, longitudinally extending metal strips embedded in said insulation at varying radial distances from the conductors and metallic sheathing surrounding said insulation, of a cable joint connecting said cable sections, said joint comprising a metallic cylindrical enclosing casing having its ends surrounding and connected to the sheathing of said cable sections, said cable sections having end portions projecting into said enclosing casing, said end portions having their outer sheathing removed and their insulation tapered in steps of progressively increasing length from the cable sheathing to their connected cable conductors, the circumferential surfaces of said steps being flush with said metal strips, and cylindrical electric conducting means mounted on said steps and connected to said metal strips, said cylindrical conducting means being of such dimensions as to produce a uniform potential gradient extending from the cable sheathing to the conductors.

5. The combination in a cable joint of two lengths of cable each comprising a central main conductor, a surrounding wall of insulation, and an enclosing sheath, the cable lengths being arranged in end-to-end relation with the sheaths removed from the adjacent end portions of said lengths and the exposed insulation cut back in steps, means connecting said cable conductors end-to-end, a plurality of conducting rings encircling said cable conductors on the surfaces of said steps, and conducting members extending from said rings longitudinally within the cable insulation and forming the only electrical connections to said rings.

6. The combination in a cable joint of two lengths of cable each comprising a central main conductor, a surrounding wall of insulation, and an enclosing sheath, the cable lengths being arranged in end-to-end relation with the sheaths removed from the adjacent end portions of said lengths and the exposed insulation cut back in steps, means connecting said cable conductors end-to-end, a plurality of conducting rings encircling said cable conductors on the surfaces of said steps, conducting members extending from said rings longitudinally within the cable insulation and forming the only electrical connections to said rings, a cylindrical insulating wall larger than the diameter of the cable surrounding the joined cable ends, a casing surrounding the last mentioned insulating wall and connected fluid tight at its ends to the sheaths of the two cable lengths, and a body of insulating compound filling all spaces within said casing.

7. The combination in a cable joint of two lengths of cable each comprising a central main conductor, a surrounding wall of insulation, and an enclosing sheath, the cable lengths being arranged in end-to-end relation with the sheaths removed from the adjacent end portions of said lengths and the exposed insulation cut back in steps, means connecting said cable conductors end-to-end, a plurality of conducting members encircling said cable conductors on the surfaces of said steps, said conducting members providing conducting surfaces flaring outwardly from the step surfaces, and other conducting members extending from said first mentioned conducting members longitudinally within the cable insulation and forming the only electrical connections thereto.

8. The combination in a cable joint of two lengths of cable each comprising a central main conductor, a surrounding wall of insulation, and an enclosing sheath, the cable lengths being arranged in end-to-end relation with the sheaths removed from the adjacent end portions of said lengths and the exposed insulation cut back in steps, means connecting said cable conductors end-to-end, and a plurality of conducting members encircling said cable conductors on the surfaces of said steps, said members providing conducting surfaces flaring outwardly from the step surfaces adjacent the ends thereof nearest the cable sheath.

9. The combination with a sheathed electric cable comprising a central main conductor, an enclosing wall of insulation and a surrounding sheath, a portion of the sheath being removed from the end of the cable and the exposed insulation cut back in steps, of a plurality of conducting rings encircling said cable conductor on the surfaces of said steps, and a plurality of other conducting members extending from said rings longitudinally within the cable insulation and forming the only electrical connections to said rings.

10. The combination with a sheathed electric cable comprising a central main conductor, an enclosing wall of insulation and a surrounding sheath, a portion of the sheath being removed from the end of the cable and the exposed insulation cut back in steps, of a plurality of conducting members encircling said cable conductor on the surfaces of said steps and providing conducting surfaces flaring outwardly from the step surfaces adjacent the ends thereof nearest the cable sheath.

11. The combination with a sheathed electric cable comprising a central main conductor, an enclosing wall of insulation and a surrounding sheath, a portion of the sheath being removed from the end of the cable and the exposed insulation cut back in steps, of a plurality of conducting members encircling said cable conductor on the surfaces of said steps adjacent the ends thereof nearest the cable sheath and providing conducting surfaces flaring outwardly from the step surfaces, and a plurality of other conducting members electrically connected to and extending from said first mentioned conducting members longitudinally within the cable insulation.

FRAZER W. GAY.